US008235687B2

(12) United States Patent
Hasegawa

(10) Patent No.: US 8,235,687 B2
(45) Date of Patent: Aug. 7, 2012

(54) ELECTRIC COMPRESSOR

(75) Inventor: Takehiro Hasegawa, Isesaki (JP)

(73) Assignee: Sanden Corporation, Isesaki-shi, Gunma (JP)

(*) Notice: Subject to any disclaimer, the term of this patent is extended or adjusted under 35 U.S.C. 154(b) by 1054 days.

(21) Appl. No.: 11/915,931

(22) PCT Filed: May 2, 2006

(86) PCT No.: PCT/JP2006/309150
§ 371 (c)(1),
(2), (4) Date: Nov. 29, 2007

(87) PCT Pub. No.: WO2006/129448
PCT Pub. Date: Dec. 7, 2006

(65) Prior Publication Data
US 2009/0129954 A1 May 21, 2009

(30) Foreign Application Priority Data
May 30, 2005 (JP) ................. 2005-156757

(51) Int. Cl.
*F04B 35/04* (2006.01)
*H02K 5/24* (2006.01)
*H02K 11/00* (2006.01)
*H01R 13/627* (2006.01)
*H01R 4/38* (2006.01)
*H01R 13/648* (2006.01)

(52) U.S. Cl. ......... 417/423.7; 310/51; 310/71; 439/357; 439/382

(58) Field of Classification Search .......... 417/374, 417/410.5, 410.1, 423.7; 439/382, 383, 384, 439/385, 353, 357; 310/51, 71
See application file for complete search history.

(56) References Cited

U.S. PATENT DOCUMENTS 3,457,867 A * 7/1969 Komor et al. ............. 417/422
4,626,721 A * 12/1986 Ouchi ...................... 310/71
4,836,794 A * 6/1989 Barr ......................... 439/135
(Continued)

FOREIGN PATENT DOCUMENTS
JP S59-037862 U 3/1984
(Continued)

OTHER PUBLICATIONS

Canadian Intellectual Property Office; Office Action in Canadian Patent Application No. 2,610,060 mailed Nov. 18, 2009.
(Continued)

*Primary Examiner* — Devon C Kramer
*Assistant Examiner* — Bryan Lettman
(74) *Attorney, Agent, or Firm* — Baker Botts L.L.P.

(57) ABSTRACT

An electric compressor incorporating an electric motor for driving a compression mechanism and containing, in a compressor housing, a joint between an external terminal for supplying power to the electric motor and an end of a wire from a stator of the electric motor. The electric compressor has a vibration proof structure mechanically preventing at least one of disconnection, electrical instantaneous interruption, and damage on an insulating member that are caused by vibration at the joint and/or the vicinity of the joint. The vibration proof structure can adopt various structures. When such a mechanical vibration proof structure is provided in the electric compressor, vibration proof performance can be enhanced at the joint of a motor terminal with good productivity achieved, and occurrence of disconnection and instantaneous interruption of the terminal joint can be prevented.

15 Claims, 4 Drawing Sheets

U.S. PATENT DOCUMENTS

| | | | |
|---|---|---|---|
| 5,718,596 A * | 2/1998 | Inaba et al. | 439/352 |
| 6,280,237 B1 | 8/2001 | Saka et al. | |
| 6,779,989 B2 | 8/2004 | Makino et al. | |
| 7,278,833 B2 * | 10/2007 | Higashiyama et al. | 417/362 |
| 2003/0152467 A1 * | 8/2003 | Higashiyama et al. | 417/374 |
| 2004/0179959 A1 * | 9/2004 | Hasegawa | 417/374 |
| 2004/0253124 A1 * | 12/2004 | Ioi et al. | 417/410.1 |

FOREIGN PATENT DOCUMENTS

| | | |
|---|---|---|
| JP | H04-017787 A | 1/1992 |
| JP | 2002-155862 A | 5/2002 |
| JP | 2002-276550 A | 9/2002 |
| JP | 2003-161257 A | 6/2003 |
| JP | 2005-085648 A | 3/2005 |

OTHER PUBLICATIONS

Japanese Patent Office, International Search Report for International for International Application No. PCT/JP2006/309150, mailed Aug. 15, 2006.

* cited by examiner

ELECTRIC COMPRESSOR

CROSS-REFERENCE TO RELATED APPLICATION

This application is the National Stage of International Patent Application No. PCT/JP2006/309150, filed May 2, 2006, which claims the benefit of Japanese Patent Application No. 2005-156757, filed May 30, 2005, the disclosures of which are incorporated herein by reference.

TECHNICAL FIELD OF THE INVENTION

The present invention relates to an electric compressor incorporating an electric motor for driving a compression mechanism, and specifically, to a structure for enhancing a vibration proof performance of a joint of motor terminals in an electric compressor including a hybrid compressor which is suitable for use in a refrigeration system for vehicles, etc.

BACKGROUND ART OF THE INVENTION

In an electric compressor incorporating an electric motor for driving a compression mechanism, particularly, an electric compressor used for a refrigeration system for vehicles, etc., because usually a high-voltage motor is used, a structure is required from the viewpoint of safety and the like, wherein there is no fear of leak by insulating between a terminal portion of a motor and its joint, and a motor housing portion and a compressor housing portion (that is, a body portion). In such an electric compressor, usually, a structure is frequently employed, wherein a joint between an external terminal for supplying power to the incorporated electric motor and an end of a wire from a stator of the electric motor is provided, and the joint is contained in the compressor housing, in particular, in a hollow projected portion extending outward.

Further, even in an electric compressor using a high-voltage motor and used for a refrigeration system for vehicles and the like, the above-described joint is frequently designed similarly in a general compressor for domestic electric equipment. Namely, a terminal joint is held only by a force of a spring attached to a terminal, and in most cases, special countermeasures for vibration proof are not employed. For example, in most cases, terminal and coupler for general compressor for domestic electric equipment are used, a structure pressing a terminal joint only by a spring force is employed, and it is not fixed by suing a fixing means such as a bolt. Therefore, when a large load greater than the spring force is applied, there is a possibility that causes disconnection or instantaneous interruption (a phenomenon causing an instantaneous separation and breaking an electric connection instantaneously) of the terminal joint. In particular, in an electric compressor mounted on a vehicle which is likely to be applied with an external force due to vibration, such a problem is liable to occur. In such a structure, however, productivity and cost are good because the structure is simple.

On the other hand, as a structure for enhancing the vibration proof performance of the motor terminal joint, for example, as depicted in FIG. 4, also known is a structure wherein an epoxy resin 103 is injected around the terminal joint between external terminal 101 for supplying power and end of wire 102 from a stator, thereby molding the portion around the joint. The resin 103 insulates between compressor housing 104 and the terminal. In this structure, since the portion around the terminal is molded by the resin, although the possibility of disconnection due to vibration becomes less, because the metal forming the terminal and the resin cured after injected are different in coefficient of linear expansion from each other, there is a possibility that it is deformed in a direction cutting the terminal depending upon the temperature therearound. Further, although the cost is low because the structure is simple, the productivity is poor because a time for curing the resin on a production line is required.

Such a problem with respect to the joint exists not only in a simple electric compressor incorporating an electric motor for driving a compression mechanism but also in a hybrid compressor using an incorporated electric motor and an external drive source different from the incorporated electric motor (for example, an engine for running a vehicle) as drive forces for respective compression mechanisms.

For example, as a hybrid compressor used in a refrigeration system for a vehicle, proposed is a hybrid compressor in which a scroll type first compression mechanism driven only by a prime mover for a vehicle and a scroll type second compression mechanism driven only by an incorporated electric motor are integrally assembled at a condition where fixed scrolls of both compression mechanisms are disposed back to back (Patent document 1). By such a hybrid compressor, it becomes possible to operate the respective compression mechanisms individually or simultaneously and achieve an optimum discharge performance depending upon requirements at a time to be controlled. Even in such a hybrid compressor, there is the above-described problem in the terminal joint for the incorporated electric motor. Patent document 1: JP-A-2003-161257

DISCLOSURE OF THE INVENTION

Problems to be Solved by the Invention

Accordingly, an object of the present invention is to provide an electric compressor incorporating an electric motor which can enhance a vibration proof performance of a motor terminal joint while achieving a good productivity, thereby preventing occurrence of disconnection and instantaneous interruption of the terminal joint.

Means for Solving the Problems

To achieve the above-described object, an electric compressor according to the present invention incorporates an electric motor for driving a compression mechanism and contains a joint between an external terminal for supplying power to the electric motor and an end of a wire from a stator of the electric motor in a compressor housing, and the electric compressor comprises a vibration proof means for mechanically preventing at least one of disconnection, electrical instantaneous interruption, and damage on an insulating member, that are caused by vibration at the joint and/or the vicinity of the joint.

As the structure of the joint, for example, a structure may be employed wherein the joint is formed via a coupler structure comprising a tab housing holding the external terminal for supplying power and a receptacle housing holding the end of the wire from the stator and being fitted to the tab housing with each other.

As the vibration proof means, the following various structures may be employed. For example, a structure may be employed wherein an O-ring interposed between the tab housing and the receptacle housing is provided as the vibration proof means.

Further, a structure may be employed wherein an elastic material interposed between an outer or inner end portion of the tab housing and an inner or outer end portion of the receptacle housing is provided as the vibration proof means. As this elastic material, for example, a rubber member, which can be deformed in its longitudinal direction by compression and can be expanded in its radial direction, may be used.

Further, a structure may be employed wherein a lock mechanism disposed between the tab housing and the receptacle housing for engaging both housings to each other is provided as the vibration proof means.

Further, a structure may be employed wherein an elastic member capable of pressing the tab housing toward inside of the compressor housing is provided as the vibration proof means. As this elastic member, for example, a wave washer can be used. Further, a structure may be employed wherein a flat washer is interposed between the wave washer and the tab housing.

Further, a structure may be employed wherein an O-ring interposed between the tab housing and the compressor housing is provided as the vibration proof means.

Furthermore, a structure may be employed wherein a wire holding means provided on a receptacle housing side for elastically holding the wire from the stator is provided as the vibration proof means. For example, this wire holding means is formed as a rubber member. Further, this wire holding means may be held by a holding member attached to the receptacle housing (for example, a pressing plate described later), and alternatively, instead of providing such a holding member, it may be attached directly to the wire from the stator by a method such as caulking and may be held in the receptacle housing.

The joint may be disposed in a hollow projected portion formed on a housing, which contains the electric motor and in which the stator is fixed, and extending outward. This hollow projected portion may be substantially closed relative to outside of compressor.

The structure for enhancing the vibration proof performance of the terminal joint according to the present invention can be applied to any type electric compressor, and can also be applied to a so-called hybrid compressor. For example, it can be applied to a case where, as aforementioned, the electric compressor is a hybrid compressor in which a first compression mechanism driven only by a first drive source different from the incorporated electric motor and a second compression mechanism driven only by the incorporated electric motor provided as a second drive source are provided together and assembled integrally.

In such a hybrid compressor, for example, a structure may be employed wherein the first and second compression mechanisms are scroll type compression mechanisms, and fixed scrolls of both compression mechanisms are disposed back to back. These fixed scrolls disposed back to back may be formed as a fixed scroll member integrally formed. Further, as the first drive source, a prime mover for a vehicle, for example, an engine for running a vehicle or an electric motor different from the above-described incorporated electric motor, may be used.

Effect According to the Invention

In the electric compressor according to the present invention, by employing the above-described various vibration proof structures for the terminal joint solely or at a combination form, disconnection or instantaneous interruption of the terminal joint, further damage to insulating members provided therearound, due to vibration applied from outside of the compressor, may be effectively prevented or suppressed, and even under an environmental condition with vibration, a stable joint condition may be maintained. Further, as compared with the aforementioned case having an epoxy resin injection process, because the resin injection process can be omitted, the time for preparing the resin and the time for curing the resin become unnecessary, and therefore, the productivity may be improved.

EXPLANATION OF SYMBOLS

Figure 1:
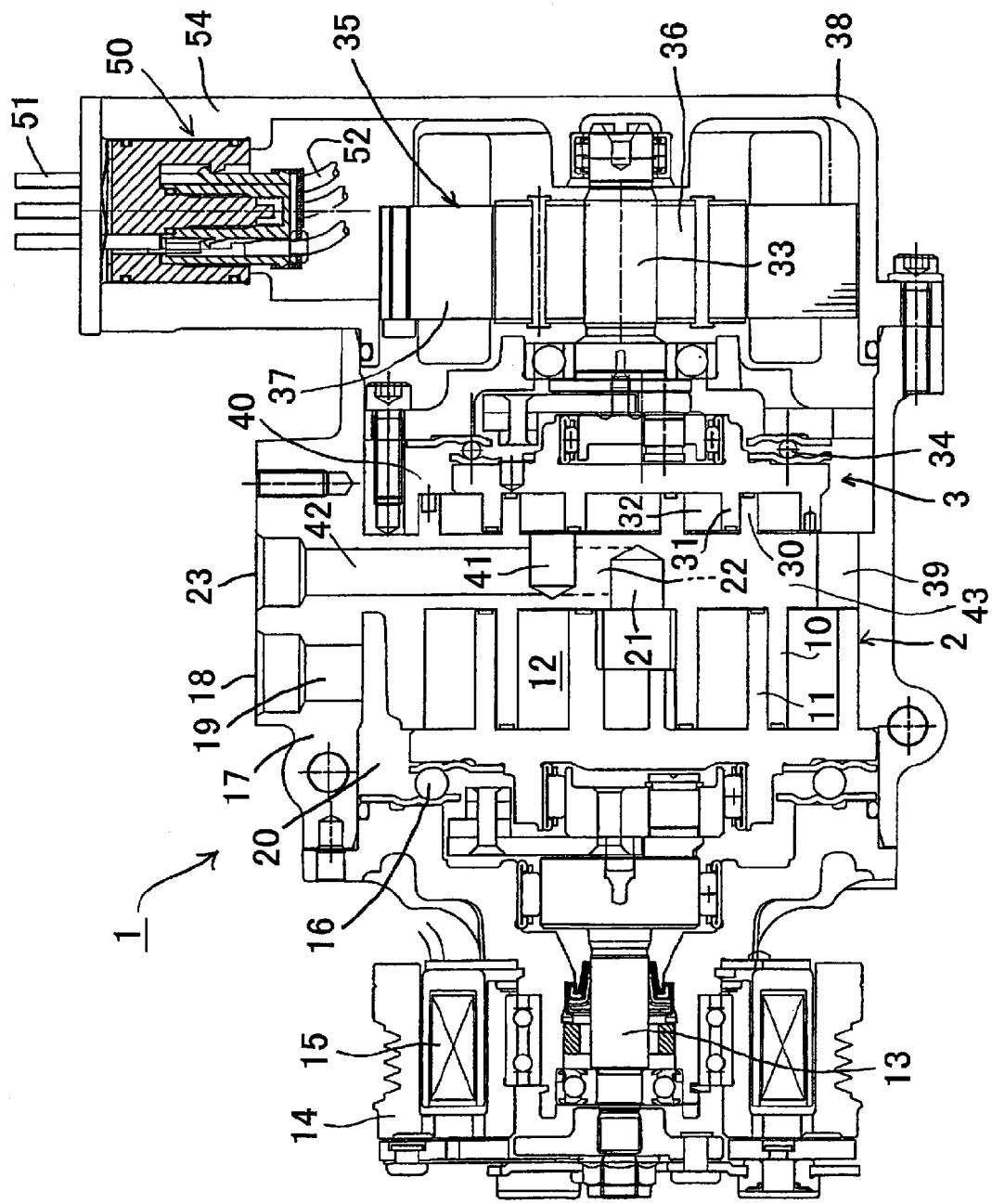
FIG. 1 is a vertical sectional view of a hybrid compressor as an electric compressor according to an embodiment of the present invention.

1: hybrid compressor as electric compressor
2: first compression mechanism
3: second compression mechanism
10, 30: fixed scroll
11, 31: movable scroll
12, 32: operational space (fluid pocket)
13, 33: drive shaft
15: electromagnetic clutch
18: suction port
20, 40: suction chamber
21, 41: discharge hole
22, 42: discharge path
35: electric motor
36: rotor
37: stator
38: stator housing
39: communication path
43: fixed scroll member
50: terminal portion
51: external terminal for supplying power
52: wire from stator
53: joint
54: hollow projected portion
55: lid
56: tab housing
57: receptacle housing
58: hollow portion
59: supporting portion
60: hollow portion
61: O-ring
62: elastic material
63: lock mechanism
64, 65: claw
66: wave washer as elastic member
67: projection
67: projection
68: flat washer
69: O-ring
70: pressing plate as holding means
71: wire holding means
80: wire holding means
81: wire
82: terminal
83: receptacle housing

THE BEST MODE FOR CARRYING OUT THE INVENTION

Hereinafter, desirable embodiments of the present invention will be explained referring to figures.

Figure 2:
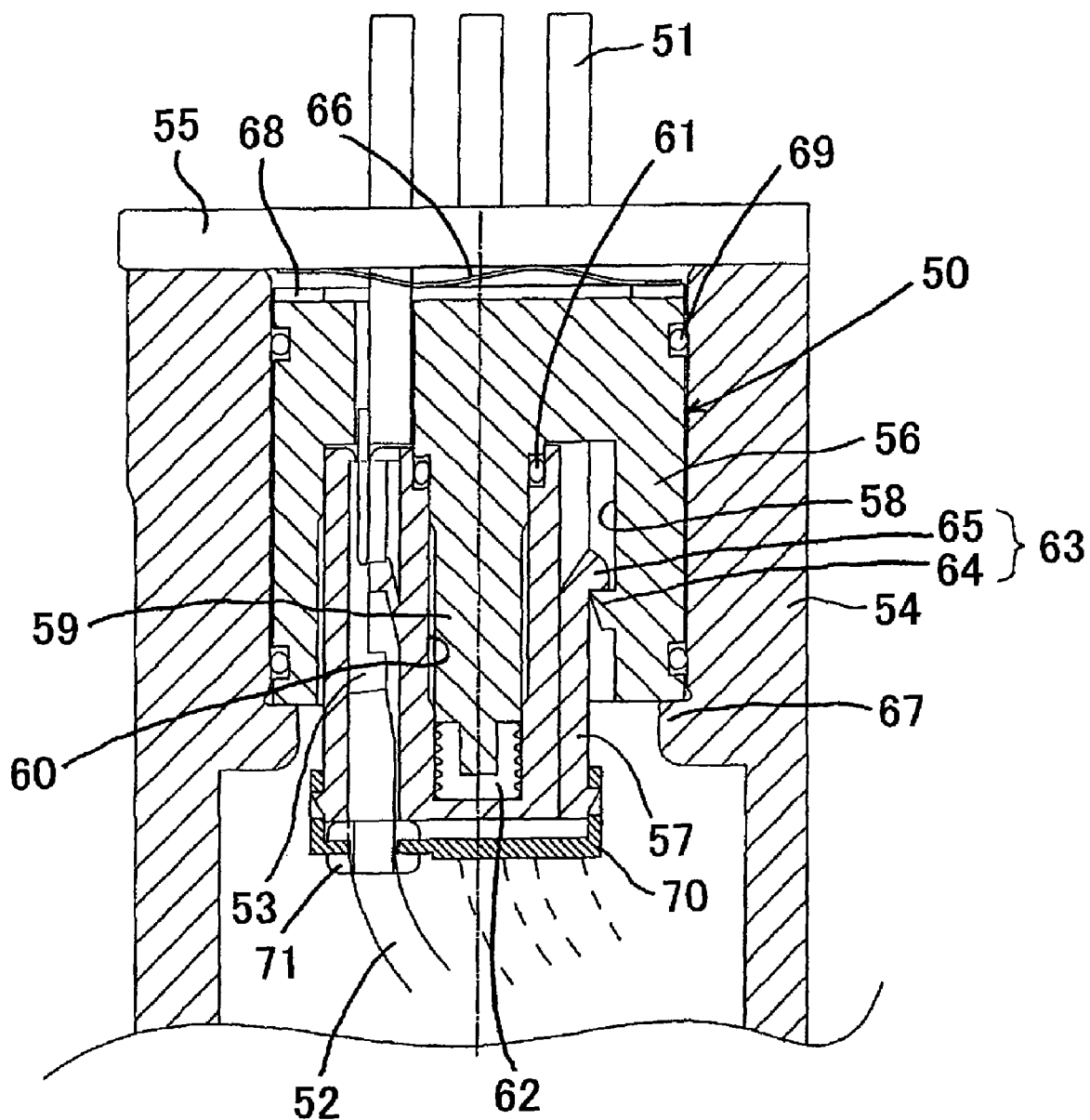
FIG. 2 is an enlarged, vertical sectional view of a terminal portion of the hybrid compressor depicted in FIG. 1.

FIG. 1 depicts an electric compressor according to an embodiment of the present invention, in particular, shows a case where the present invention is applied to a hybrid compressor. Although FIG. 2 depicts a structure for enhancing the vibration proof performance of the terminal joint of an electric motor incorporated into the hybrid compressor depicted in FIG. 2, this structure shown in FIG. 2 is a structure capable of being applied to not only the hybrid compressor but also an electric compressor merely having an incorporated electric motor as an only one drive source.

First, the hybrid compressor depicted in FIG. 1 will be explained. Hybrid compressor 1 is formed as a scroll type compressor, and has a first compression mechanism 2 and a second compression mechanism 3. First compression mechanism 2 has a fixed scroll 10, a movable scroll 11 forming a plurality of pairs of operational spaces (fluid pockets) 12 by engaging with fixed scroll 10, a drive shaft 13 driving movable scroll 11 at an orbital movement by engaging with movable scroll 11, an electromagnetic clutch 15 for an on-off operation of the transmission of a driving force between a pulley 14, to which the driving force from a prime mover for running a vehicle (not shown) provided as a first drive source is transmitted, and the drive shaft 13, a ball coupling 16 provided as a rotation preventing means for preventing the rotation of movable scroll 11, and a suction port 18 formed on a casing 17. The fluid to be compressed (for example, refrigerant gas) sucked from suction port 18 into a suction chamber 20 through a suction path 19 is taken into operational spaces 12, the operational spaces 12 are moved toward the center of fixed scroll 10 while the volumes of the operational spaces 12 are decreased, and by this operation, the refrigerant gas in the operational spaces 12 is compressed. A discharge hole 21 is formed on the central portion of fixed scroll 10, and the compressed refrigerant gas is discharged to a high-pressure side of an external refrigerant circuit through the discharge hole 21, a discharge path 22 and a discharge port 23.

On the other hand, second compression mechanism 3 has a fixed scroll 30, a movable scroll 31 forming a plurality of pairs of operational spaces (fluid pockets) 32 by engaging with fixed scroll 30, a drive shaft 33 driving movable scroll 31 at an orbital movement by engaging with movable scroll 31, and a ball coupling 34 provided as a rotation preventing means for preventing the rotation of movable scroll 31. An electric motor 35 is incorporated in order to drive the drive shaft 33 of this second compression mechanism 3. Electric motor 35 has a rotor 36 fixed to drive shaft 33 and a stator 37, the stator 37 is fixed to a stator housing 38 or a stator housing 38 which is formed as a part of the compressor housing, and the whole of electric motor 35 is contained in the stator housing 38. In this second compression mechanism 3, the fluid to be compressed (for example, refrigerant gas) sucked from suction port 18 into suction chamber 20 of first compression mechanism 2 is sucked into a suction chamber 40 of second compression mechanism 3 through a communication path 39, the gas is taken into operational spaces 32, the operational spaces 32 are moved toward the center of fixed scroll 30 while the volumes of the operational spaces 32 are decreased, and by this operation, the refrigerant gas in the operational spaces 32 is compressed. A discharge hole 41 is formed on the central portion of fixed scroll 30, and the compressed refrigerant gas is discharged to the high-pressure side of the external refrigerant circuit through the discharge hole 41 and a discharge path 42.

In this embodiment, fixed scroll 10 of first compression mechanism 2 and fixed scroll 30 of second compression mechanism 3 are disposed back to back, and both fixed scrolls 10 and 30 are formed as an integrated fixed scroll member 43.

When only first compression mechanism 2 of hybrid compressor 1 is operated, an electricity is not supplied to electric motor 35 for driving second compression mechanism 3, and the electric motor 35 is not rotated. Therefore, second compression mechanism 3 does not operate. When the hybrid compressor 1 is driven only by electric motor 35, the electric motor 35 is turned to be on and rotated, the rotation of the electric motor 35 is transmitted to drive shaft 33 of second compression mechanism 3, and the orbital movement of movable scroll 31 is performed by the drive shaft 33. At that time, electromagnetic clutch 15 of first compression mechanism 2 is not excited, and the rotation of the prime mover for running a vehicle as a first drive source is not transmitted to the first compression mechanism 2. Therefore, first compression mechanism 2 does not operate. When both first and second compression mechanisms 2 and 3 are driven simultaneously, the driving force from the prime mover for running a vehicle is transmitted to movable scroll 11 of first compression mechanism 2 as well as electric motor 35 is turned to be on and the driving force thereof is transmitted to movable scroll 31 of second compression mechanism 3.

In hybrid compressor 1 as an electric compressor thus constructed, terminal portion 50 of electric motor 35 is disposed at an upper portion of the hybrid compressor 1 which is in a mounted condition. In the detailed structure of this terminal portion 50, as depicted in FIG. 2, joints 53 between external terminals 51 for supplying power to electric motor 35 and the ends of wires 52 from stator 37 of electric motor 35 are provided. Joints 53 are disposed in a hollow projected portion 54 which is formed on stator housing 38 and extends toward outside, and external terminals 51 for supplying power are attached to a lid 55 which substantially can close this hollow projected portion 54.

In this embodiment, the above-described joint 53 is formed via a coupler structure which comprises a tab housing 56 holding external terminal 51 for supplying power and a receptacle housing 57 holding the end of wire 52 from stator 37 and being fitted to the tab housing 56 with each other. In more detail, a hollow portion 58 for containing receptacle housing 57 is formed and a supporting portion 59 extending downward is provided at the central portion of tab housing 56. A hollow portion 60 of receptacle housing 57, formed as a cup-like shape, is fitted to this supporting portion 59.

Then, in this embodiment, as the vibration proof means for joint 53, the following various structures are employed together. However, the structures explained in the following can be employed as each structure. In this embodiment, first, an O-ring 61 is interposed between the outer circumferential surface of supporting portion 59 of tab housing 56 and the inner circumferential surface of hollow portion 60 of receptacle housing 57. This O-ring 61 mainly functions to prevent vibration in the horizontal direction between tab housing 56 and receptacle housing 57.

Further, an elastic material 62 is interposed between the outer end portion (tip portion) of supporting portion 59 of tab housing 56 (or the inner end portion in accordance with the fitting structure with receptacle housing 57) and the inner end portion (bottom portion) of hollow portion 60 of receptacle housing 57 (or the outer end portion in accordance with the fitting structure with tab housing 56). This elastic material 62 is formed from a vibration proof rubber in this embodiment, and it is formed as a member which can be deformed in its longitudinal direction by compression and can be expanded in its radial direction. Namely, by being deformed by compression, it functions to prevent vibration in the vertical direction between the outer end portion of supporting portion 59 of tab housing 56 and the inner end portion of hollow portion 60 of receptacle housing 57, and by being expanded in the radial direction by compression, it functions to prevent vibration in the horizontal direction between tab housing 56 and receptacle housing 57.

Further, a lock mechanism 63 is disposed between hollow portion 58 of tab housing 56 and the outer circumferential portion of receptacle housing 57 for engaging both housings to each other. In lock mechanism 63 of this embodiment, a claw 64 provided on the side of tab housing 56 and a claw 65 provided on the side of receptacle housing 57 engage each other. Bu such a structure, getting out of receptacle housing 57 from tab housing 56 may be prevented, and by a condition where tab housing 56 is pressed from upper side relatively to receptacle housing 57 at the time of the engaging, the above-described elastic material 62 can be compressed and fixed to make the elastic material 62 exhibit the above-described vibration preventing function.

Further, provided is a wave washer 66 as an elastic member capable of pressing tab housing 56 toward the inside of the compressor housing, particularly in this embodiment, toward the inside of hollow projected portion 54 of stator housing 38. This elastic member may be a member capable of exhibiting a pressing force except wave washer 66, for example, another spring member. Tab housing 56 abuts a projection 67 formed in hollow projected portion 54, and it is held by the pressing force of wave washer 66 relative to lid 55. By providing this wave washer 66, the function of tab housing 56 for preventing vibration in the vertical direction can be exhibited. Between this wave washer 66 and tab housing 56, preferably a flat washer 68 is interposed in order to prevent the surface of tab housing 56 from being deformed by the pressing force of wave washer 66.

Further, an O-ring 69 is preferably interposed between the outer circumferential surface, and the compressor housing, in this embodiment, the inner circumferential surface of hollow projected portion 54 of stator housing 38. By interposing this O-ring 69, the function for preventing vibration of tab housing 56 in the horizontal direction can be exhibited.

Furthermore, a pressing plate 70 is attached to the lower portion of receptacle housing 57 as a holding member for holding wire 52 from stator 37, and a wire holding means 71 is provided on this pressing plate 70 for elastically holding wire 52. This wire holding means 71 may be formed from a rubber member for example. Wire 52 is elastically held by wire holding means 71, thereby enhancing the vibration proof performance of this portion.

Figure 3:
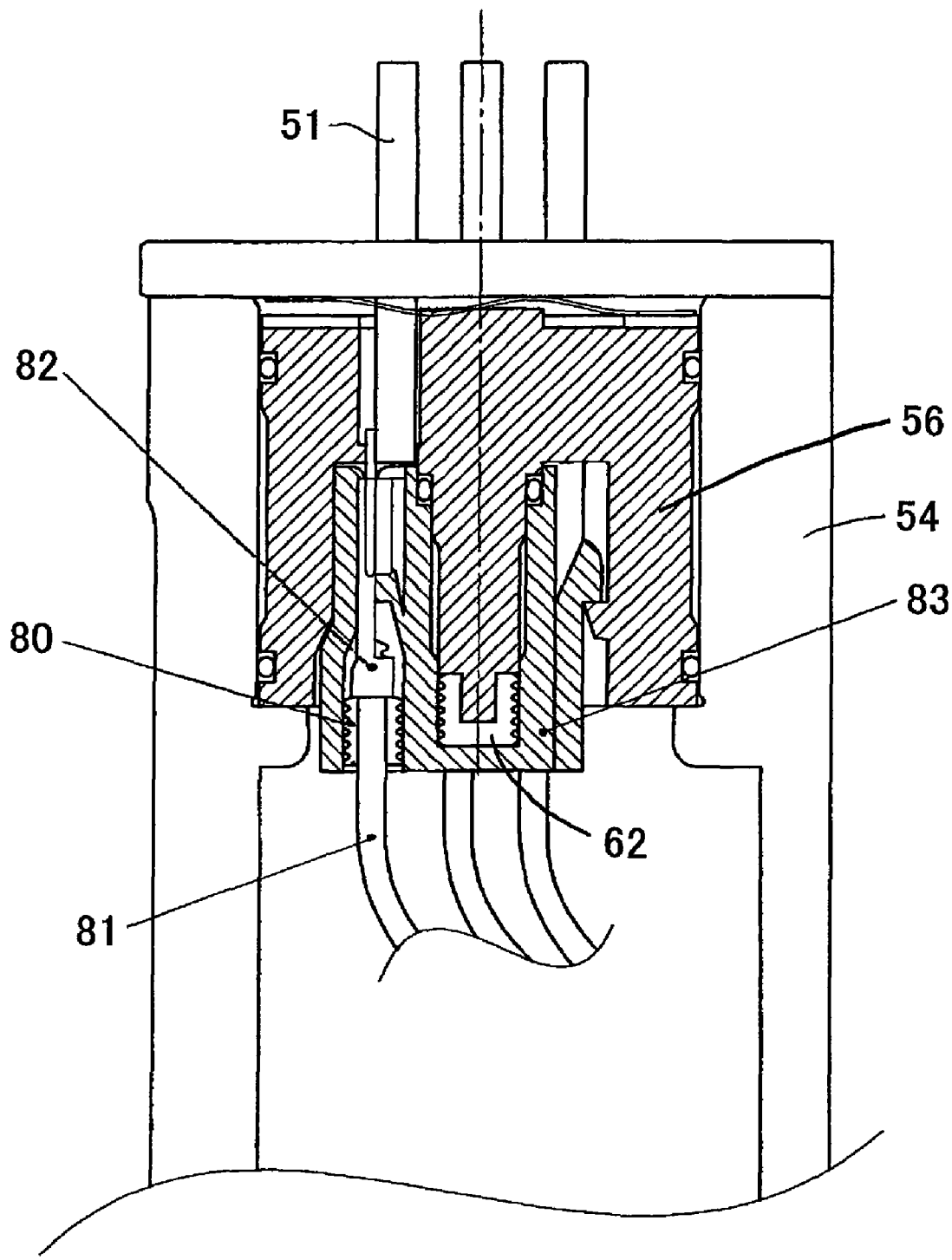
FIG. 3 is a vertical sectional view of a modification of the structure of the terminal portion depicted in FIG. 2.
Figure 4:
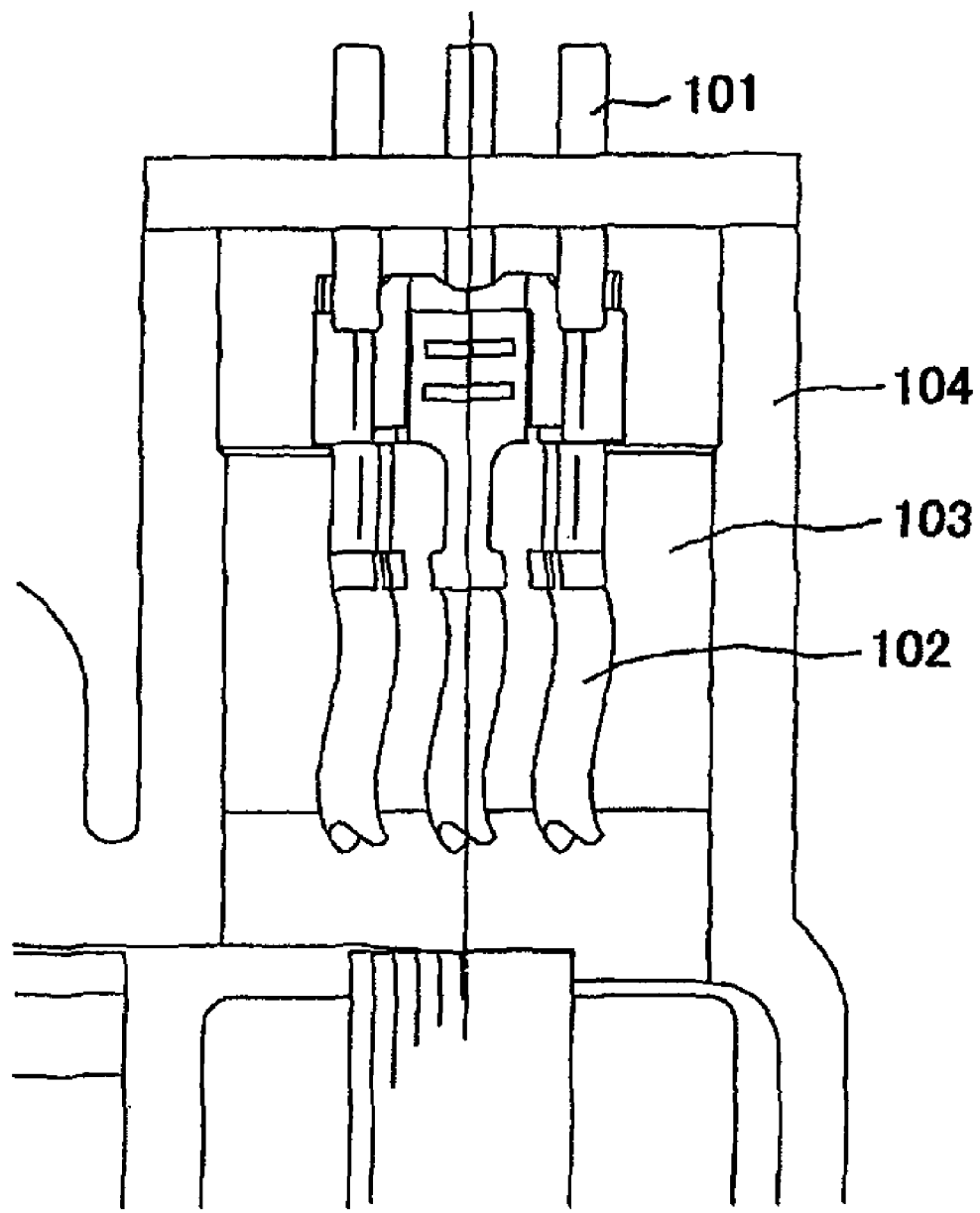
FIG. 4 is a vertical sectional view of a conventional terminal portion injected with a resin.

This wire holding means portion may be formed, for example, as shown in FIG. 3. In the structure depicted in FIG. 3, wire holding means 80, which elastically holds wire 81 from stator 37 and formed from a rubber member, is attached to wire 81 or/and terminal 82 by direct caulking and the like, and at that state, it is fitted and held in receptacle housing 83. By such a structure, the aforementioned pressing plate 70 may be omitted, and the assembling performance may be improved and the cost may be reduced. Further, because a gap between wire 81 from stator 37 and receptacle housing 83 can be abolished and pressing plate 70 can be abolished, the insulation property at this portion may be improved.

Thus, by providing at least one of the above-described various vibration proof means, the vibration proof performance of the terminal joint can be enhanced, and occurrence of the disconnection and instantaneous interruption of the terminal joint can be prevented or suppressed. Further, as compared with the aforementioned case of injecting an epoxy resin, because the time for the preparation and curing of the resin is omitted, a good productivity may be ensured.

INDUSTRIAL APPLICATION OF THE INVENTION

The present invention can be applied to any electric compressor incorporating an electric motor for driving a compression mechanism, in particular, can be applied also to an electric compressor of a hybrid compressor in which the respective compression mechanisms are driven by an incorporated electric motor and another drive source different therefrom.

The invention claimed is:

1. An electric compressor incorporating an electric motor for driving a compression mechanism and containing a joint between an external terminal for supplying power to the electric motor and an end of a wire from a stator of the electric motor in a compressor housing, said electric compressor comprising:
a vibration proof means for mechanically preventing at least one of disconnection, electrical instantaneous interruption, and damage on an insulating member, that are caused by vibration at said joint and/or the vicinity of said joint,
wherein said joint is formed via a coupler structure comprising a tab housing holding said external terminal for supplying power and a receptacle housing holding said end of said wire from said stator,
wherein said tab housing is disposed in a hollow projected portion formed on said compressor housing,
wherein said receptacle housing is fitted into said tab housing and separated by said tab housing from said compressor housing, and wherein a lock mechanism comprising a pair of claws, each formed on one of said tab housing and said receptacle housing, and disposed between said tab housing and said receptacle housing for engaging both housings to each other is provided.

2. The electric compressor according to claim 1, wherein an O-ring interposed between said tab housing and said receptacle housing is provided as said vibration proof means.

3. The electric compressor according to claim 1, wherein an elastic material interposed between an outer or inner end portion of said tab housing and an inner or outer end portion of said receptacle housing is provided as said vibration proof means.

4. The electric compressor according to claim 1, wherein an elastic member configured to press said tab housing toward inside said compressor housing is provided as said vibration proof means.

5. The electric compressor according to claim 4, wherein said elastic member is a wave washer.

6. The electric compressor according to claim 5, wherein a flat washer is interposed between said wave washer and said tab housing.

7. The electric compressor according to claim 1, wherein a wire holding means provided on a receptacle housing side for elastically holding said wire from said stator is provided as said vibration proof means.

8. The electric compressor according to claim 7, wherein said wire holding means is held by a holding member attached to said receptacle housing.

9. The electric compressor according to claim 7, wherein said wire holding means is attached to said wire from said stator and held in said receptacle housing.

10. The electric compressor according to claim 1, wherein said hollow projected portion contains said electric motor, said stator is fixed inside said hollow projected portion, and said stator extends outward from said hollow projected portion.

11. The electric compressor according to claim 10, wherein said hollow projected portion is substantially closed relative to an outside of the compressor.

12. The electric compressor according to claim 1, wherein said electric compressor is a hybrid compressor in which a first compression mechanism driven only by a first drive source different from said incorporated electric motor and a second compression mechanism driven only by said incorporated electric motor provided as a second drive source are provided together and assembled integrally.

13. The electric compressor according to claim 12, wherein said first and second compression mechanisms are scroll type compression mechanisms, and fixed scrolls of both compression mechanisms are disposed back to back.

14. The electric compressor according to claim 13, wherein said fixed scrolls disposed back to back are formed as a fixed scroll member integrally formed.

15. The electric compressor according to claim 12, wherein said first drive source is a prime mover for a vehicle.

* * * * *